(12) United States Patent
Ogawa et al.

(10) Patent No.: US 6,516,402 B2
(45) Date of Patent: Feb. 4, 2003

(54) INFORMATION PROCESSING APPARATUS WITH PARALLEL ACCUMULATION CAPABILITY

(75) Inventors: Yoshihiro Ogawa, Tokyo (JP); Toshihisa Kamemaru, Tokyo (JP); Hirokazu Suzuki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 84 days.

(21) Appl. No.: 09/802,943

(22) Filed: Mar. 12, 2001

(65) Prior Publication Data
US 2001/0037427 A1 Nov. 1, 2001

(30) Foreign Application Priority Data
Apr. 27, 2000 (JP) ......................... 2000-128300

(51) Int. Cl.[7] .................. G06F 15/76; G06F 13/14; G06F 13/40
(52) U.S. Cl. .................. 712/33; 712/201; 712/225; 710/305; 711/217
(58) Field of Search .................. 712/33, 201, 225; 711/168, 217, 169; 710/305

(56) References Cited

U.S. PATENT DOCUMENTS
4,342,080 A * 7/1982 Grondalski ................. 712/225

FOREIGN PATENT DOCUMENTS
JP A9185491 7/1997
JP A10214261 8/1998

* cited by examiner

Primary Examiner—Daniel H. Pan
(74) Attorney, Agent, or Firm—Birch, Stewart, Kolasch & Birch, LLP

(57) ABSTRACT

An initial value of read address is set in a first initial address register; an initial value of write address is set in a second initial address register; and the number of data to be accumulated by an accumulator and the frequency of repetition of accumulation are set in an accumulator count register. A controller controls the timing of output of an initial read address from a first memory controller, the timing of initialization by an initializer, and the timing of output of an initial write address from a second memory controller. Reading of data, accumulation and writing of data proceed in parallel in each cycle of accumulation.

6 Claims, 15 Drawing Sheets

FIG.4A CLOCK
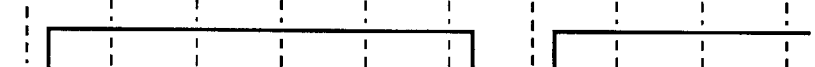
FIG.4B READ ADDRESS INITIALIZING SIGNAL
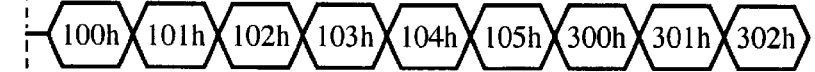
FIG.4C READ ADDRESS
FIG.4D REGISTER A
FIG.4E CONTENTS OF OPERATION
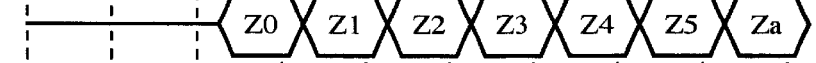
FIG.4F REGISTER C
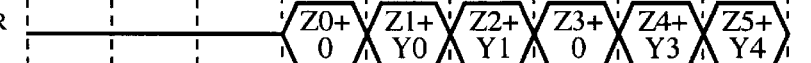
FIG.4G ACCUMULATOR CONTENTS
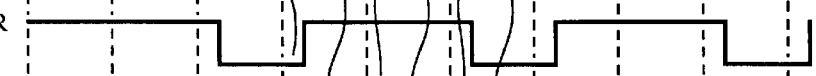
FIG.4H ACCUMULATOR INITIALIZING SIGNAL
FIG.4I REGISTER B
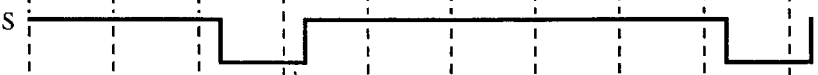
FIG.4J WRITE ADDRESS INITIALIZING SIGNAL
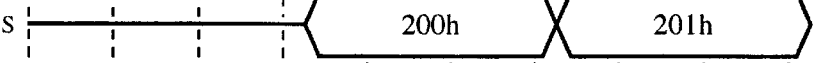
FIG.4K WRITE ADDRESS

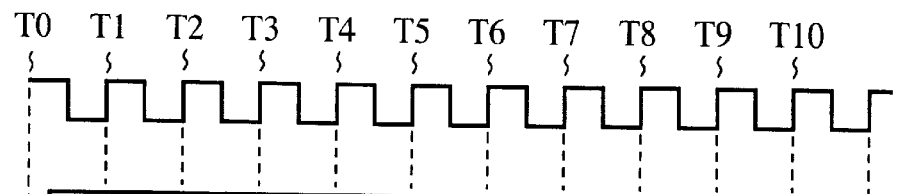
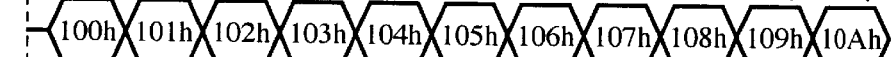
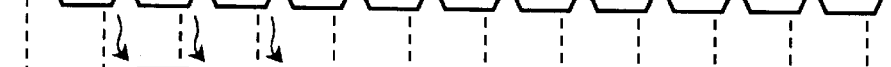
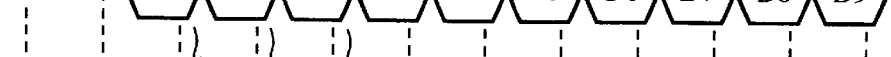
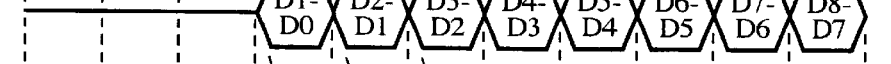
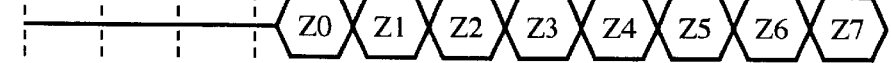

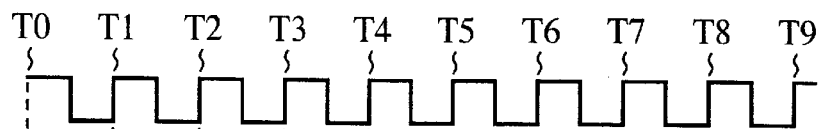
FIG.8A CLOCK
FIG.8B READ ADDRESS INITIALIZING SIGNAL
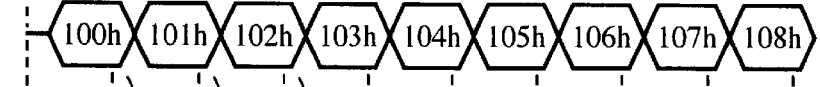
FIG.8C READ ADDRESS
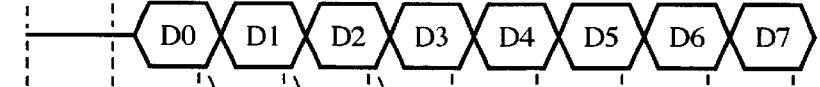
FIG.8D REGISTER A
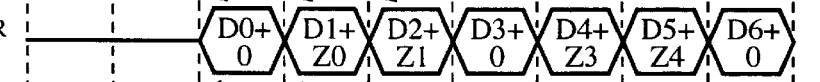
FIG.8E ACCUMULATOR CONTENTS
FIG.8F ACCUMULATOR INITIALIZING SIGNAL
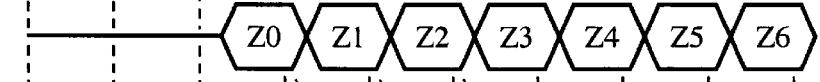
FIG.8G REGISTER B
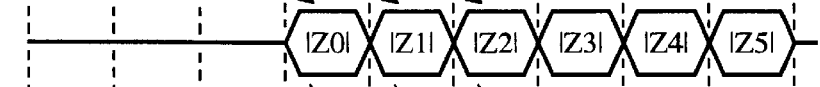
FIG.8H CONTENTS OF OPERATION
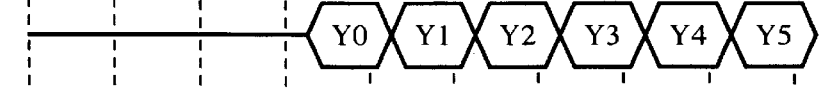
FIG.8I REGISTER C
FIG.8J WRITE ADDRESS INITIALIZING SIGNAL
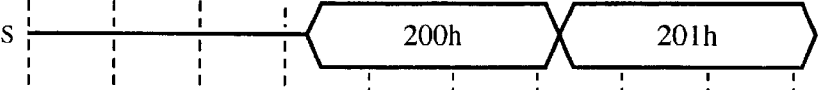
FIG.8K WRITE ADDRESS

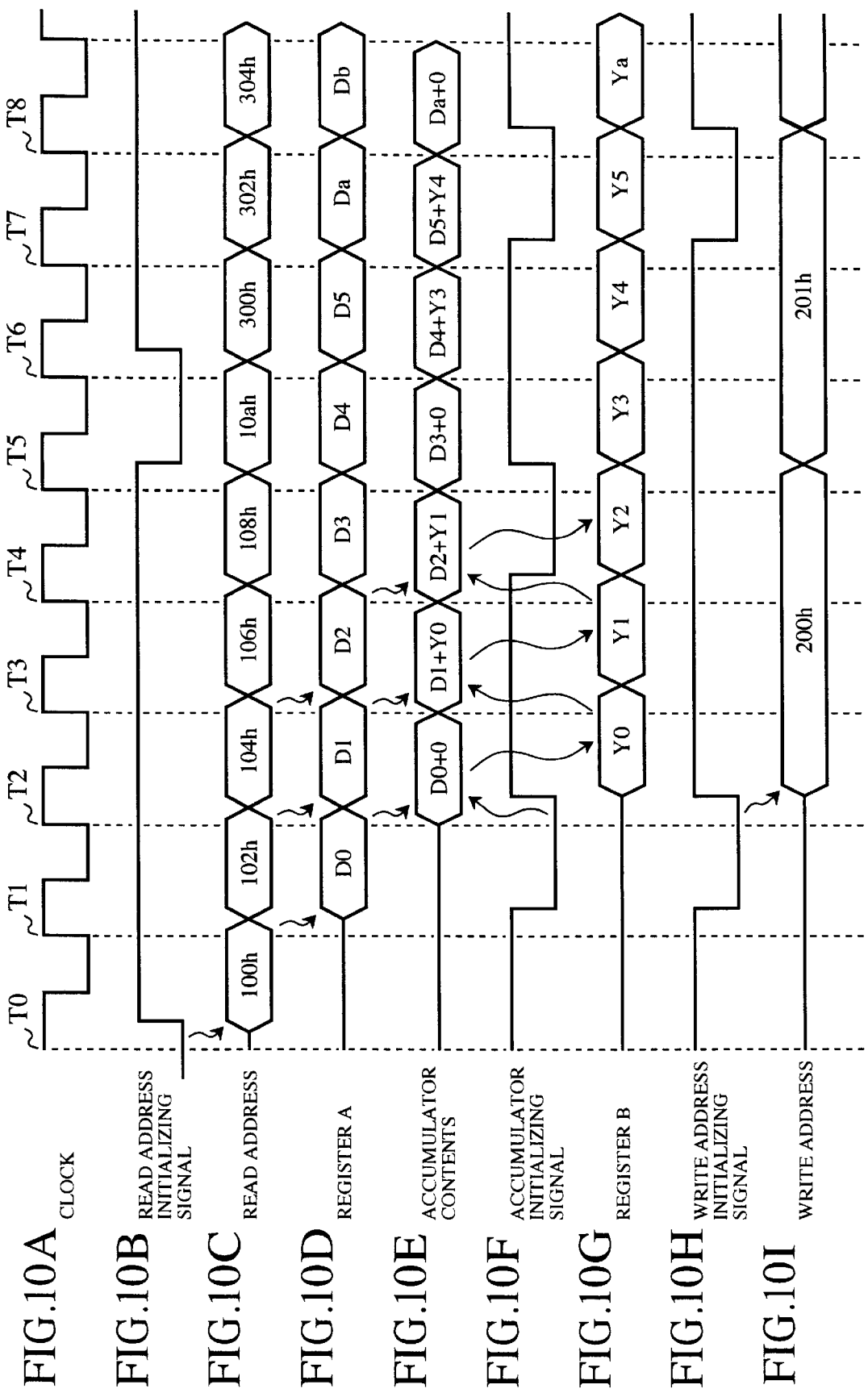

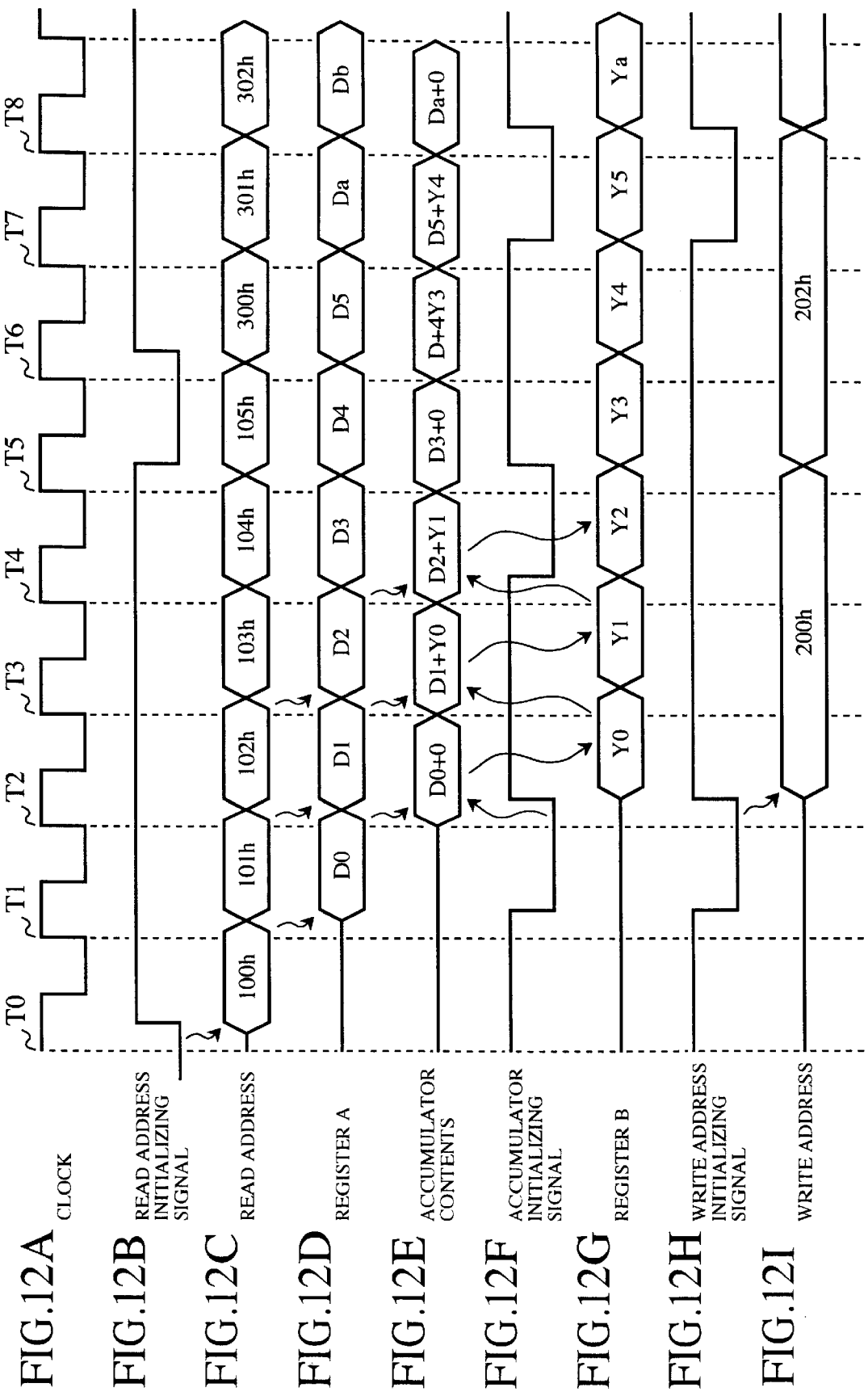

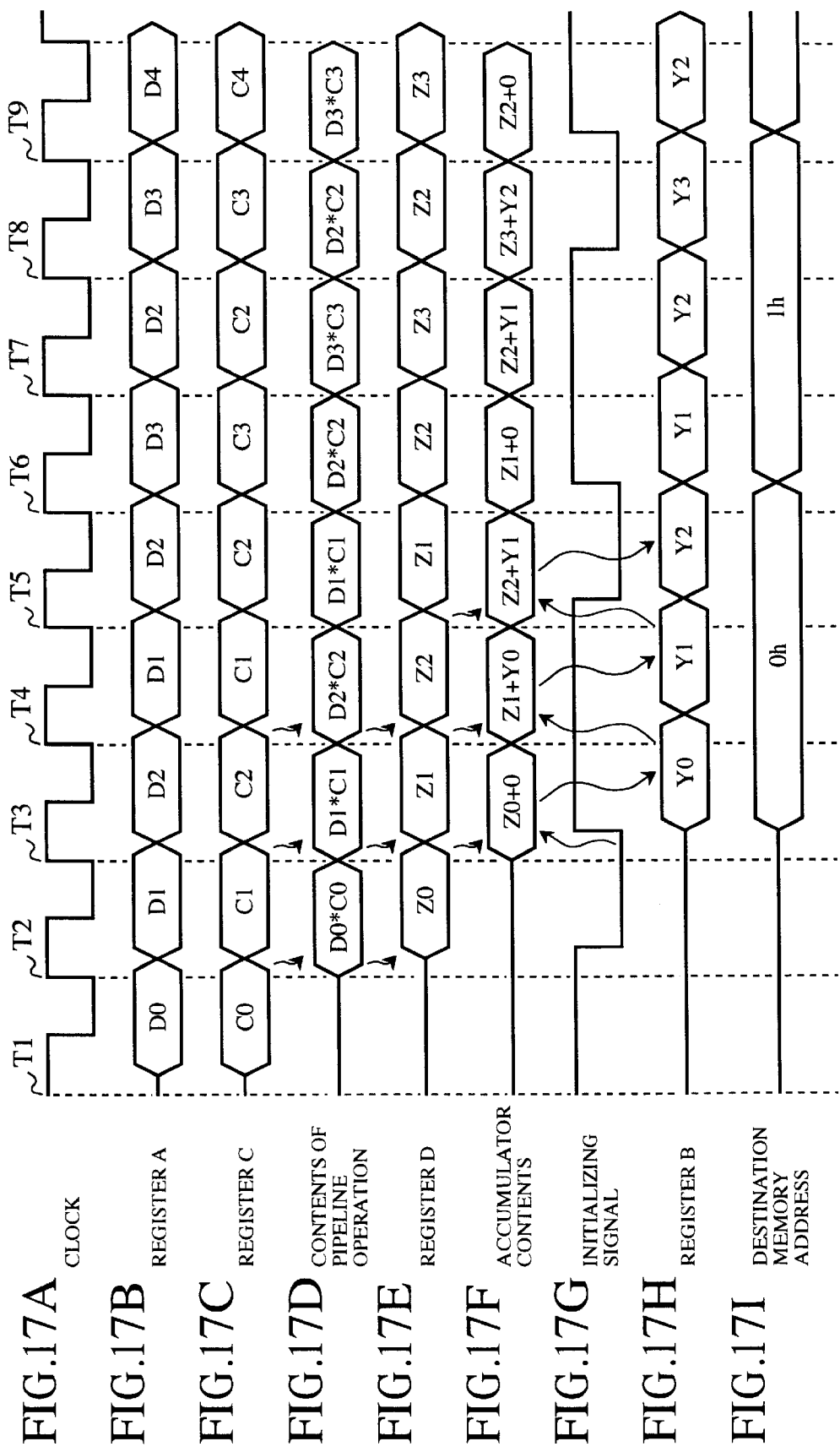

INFORMATION PROCESSING APPARATUS WITH PARALLEL ACCUMULATION CAPABILITY

BACKGROUND OF THE INVENTION

1. Field of the Invention

The present invention generally relates to an information processing apparatus and, more particularly, to a flexible information processing apparatus capable of efficiently processing parallel accumulations and to an information processing apparatus capable of processing parallel accumulations of a variety of types.

2. Description of the Related Art

FIG. 13 is a block diagram showing a construction of an information processing apparatus according to the related art capable of processing parallel accumulations. Referring to FIG. 13, the information processing apparatus according to the related art comprises a memory 201 for storing data, a register A 202 for storing the data read from the memory 201, an accumulator 203 for accumulating the data stored in the register A 202, a register B 204 for storing results of accumulation performed by the accumulator 203 and a memory controller 205 for controlling an operation of reading from the memory 201.

A description will now be given of the operation according to the related art.

FIG. 14 shows an example of how data is stored in the memory 201. Referring to FIG. 14, data D0 is stored at address 100h, data D1 at address 101h, data D2 at address 102h, data D3 at address 103h, data D4 at address 104h, data D5 at address 105h, data Y2 at address 200h, data Y5 at address 201h, and data Y8 at address 202h.

FIGS. 15A–15E are timing charts showing how the operation of the information processing apparatus according to the related art is timed. FIGS. 15A–15E show that each step of the operation occurs at a rising edge of a clock. From the memory 201, data D0 at address 100h is stored in the register A 202 at T1, data D1 at address 101h is stored at T2 and data D2 at address 102h is stored at T3. The register B 204 is initialized to 0 at T1. At T2, data D0 in the register A 202 and the data in the register B 204 are accumulated by the accumulator 203 so that a result of accumulation D0+0 is stored in the register B 204.

Accumulation and storage in the register B 204 are repeated two additional times (see FIGS. 15C and 15D) so that data Y2, a final result of accumulation stored in the register B 204, is written at T5 to the memory 201 at address 200h shown in FIG. 14. At T10, data Y5 stored in the register B 204, a result of accumulation resulting from a subsequent cycle of accumulation involving three steps, is written to the memory 201 at address 201h shown in FIG. 14.

According to the related-art information processing apparatus as described above, a redetermined number of steps of reading of data from the memory 201 and a predetermined number of steps of accumulation in the accumulator 203 proceed in parallel. Thereby, the processing time is reduced. The initialization of the accumulator 203 and the writing of the result of accumulation to the memory 201, however, are processed separately. As a result, when an accumulation of three data items is repeated twice, for example, a total of 10 cycles T1 through T10 are required.

FIG. 16 is a block diagram showing a construction of another related-art information processing apparatus with the parallel accumulation capability disclosed in Japanese Laid-Open Patent Application No. 10-214261. Referring to FIG. 16, the information processing apparatus comprises a source data memory 501, an automatic consecutive address generator 502 and a register A 505 for storing the source data. The automatic consecutive address generator 502 is used to store the source data from the source data memory 501 in the register A 505 using consecutive cycles. The apparatus further comprises a coefficient data memory 511, an automatic consecutive address generator 512 and a register C 506 for storing the coefficient data. The automatic consecutive address generator 512 is used to store the coefficient data from the coefficient data memory 511 in the register C 506 using consecutive cycles.

Referring also to FIG. 16, the apparatus further comprises a pipeline operation unit 507 producing a product of the source data stored in the register A 505 and the coefficient data stored in the register C 506. A register D 513 stores a result of operation performed by the pipeline operation unit 507. An accumulator 508 accumulates results of operation stored in the register D 513. An initializer 508 initializes a result of accumulation in the accumulator 508. A register B 509 stores the result of accumulation from the accumulator 508. The apparatus also includes a destination data memory 504.and an automatic consecutive address generator 503. The automatic consecutive address generator 503 is used to transfer the result of operation in the register B 509 to the destination data memory 504.

FIGS. 17A–17I are timing charts showing how the operation of the information processing apparatus according to the second related art described above is timed. FIGS. 17A–17I show that each step of the operation occurs at a rising edge of a clock. From the memory 501, data D0 is stored in the register A 505 at T1, data D1 is stored at T2 and data D2 is stored at T3. From the coefficient data memory 511, data C0 is stored in the register C 506 at T1, data C1 is stored at T2 and data C2 is stored at T3.

At T2, the pipeline operation unit 507 multiplies the data in the register A 505 by the data in the register C 506. A result of operation Z0, i.e. D0*C0, is stored in the register D 513. At T3, an initializing signal is at LOW so that the accumulator 508 produces an arithmetic sum of 0 and the data in the register D 513 so as to store a result of accumulation Y0, i.e. Z0+0, in the register B 509. Alternatively, when the initializing signal is at HIGH (at T4, for example) the accumulator 508 produces an arithmetic sum of the data in the register D513 and the data in the register B 509 so as to store the result of accumulation Y1, i.e. Z1+Y0, in the register B 509. The step of accumulation is repeated three times. At T6, data Y2, a result of accumulation stored in the register B 509, is written to the destination data memory 504 at memory address 0h.

The process described above is repeated until, at T9, data Y3, a result of accumulation for a second cycle of accumulation, is written to the destination data memory 504 at memory address 1h. Thus, a repetition including two cycles of accumulation of three data items requires a total of 9 cycles T1 through T9. Excluding the pipeline operation, the first and second related-art apparatuses discussed are directed to a similar operation. A difference is that the second related-art apparatus provides an improvement in the processing efficiency by requiring only a total of 8 cycles.

To summarize, in the information processing apparatus according to the second related art discussed, the reading of the source data from the source data memory 501, the reading of the coefficient data from the coefficient data memory 511, the operation in the pipeline operation unit 507 and the accumulation in the accumulator 508 proceed in parallel such that predetermined number of each of these steps occur simultaneously. Additionally, the initialization of the result of accumulation performed by the accumulator 508, the series of accumulation and the writing of the result of operation to the destination memory 504 proceed in parallel such that predetermined number of each of these steps occur simultaneously. Thereby, the processing time for successive accumulations is reduced.

A disadvantage with the information processing apparatus according to the first related art is that, for each cycle of accumulation, the initialization of the accumulator 203 and the transfer of the result of accumulation to the memory 201 are required. As a result, the overall processing time is relatively long so that the processing efficiency is relatively low, when successive accumulations occur.

While the information processing apparatus according to the second related art is successful in resolving the problem with the first apparatus, the frequency of repetition of accumulation cannot be changed readily since the initializer 510, the automatic consecutive address generators 502, 503 and 512 are constructed to be independent of each other. It is also difficult to modify the read address in the source data memory 501 or the write address in the destination data memory 504. Therefore, the second related art is not successful in realizing a flexible information processing apparatus.

Another disadvantage with the information processing apparatus according to the second related art is that, when an extra operation, such as a shift operation or a round off operation is required in the result of operation, the extra operation should occur separately so that the overall processing time is extended.

Still another disadvantage with the apparatus according to the second related art is that, the source data subject to accumulation should be stored in a continuous area in the source data memory 501.

Yet another disadvantage with the apparatus according to the second related art is that, since the result of accumulation is written in a contiguous area in the destination data memory 504, it is imperative that a contiguous area be reserved for storage of the result of accumulation.

SUMMARY OF THE INVENTION

Accordingly, a general object of the present invention is to provide an information processing apparatus in which the aforementioned disadvantages are eliminated.

Another and more specific object of the present invention is to provide a flexible information processing apparatus in which the efficiency of parallel accumulations is improved by reducing the required processing time, and in which parallel accumulations of different types are performed.

The aforementioned objects can be achieved by an information processing apparatus comprising: a memory for storing data; a first memory controller for outputting a read address and controlling reading of the data stored in the memory; a first initial address register for storing an initial value of the read address output by the first memory controller; a first register controlled by the first memory controller to store the data read from the memory; an accumulator for accumulating the data stored in the first register; a second register for storing a result of accumulation by the accumulator; an initializer for initializing the accumulator and outputting the result of accumulation stored in the second register to the memory; a second memory controller for outputting a write address and writing the result of accumulation stored in the second register to the memory; a second initial address register for storing an initial value of the write address output by the second memory controller; an accumulator count register for storing a number of data items to be accumulated by the accumulator and a frequency of repetition of accumulation; and a controller for timing initialization of the accumulator by the initializer, based on the number of data items to be accumulated stored in the accumulator count register, for controlling timing of output of the initial read address from the first memory controller, and for controlling timing of output of the initial write address from the second memory controller, wherein reading, by the first memory controller, of the data from the memory into the first register, accumulation of the read data in the accumulator, and writing, by the second memory controller, of the result of accumulation to the memory proceed in parallel in each cycle of accumulation such that a predetermined number of each of these steps are performed simultaneously.

The information processing apparatus may further comprise: an operation unit for performing an operation on the data stored in the first register; and a third register for storing a result of operation by the operation unit, wherein the operation by the operation unit and accumulation of results of operation stored in the third register proceed in parallel in each cycle of accumulation.

The information processing apparatus may further comprise: a third register for storing first data stored in the first register; an operation unit for performing an operation on second data stored in the first register and the first data stored in the third register; and a fourth register for storing a result of operation by the operation unit, wherein the operation by the operation unit and accumulation of results of operation stored in the fourth register proceed in parallel in each cycle of accumulation.

The information processing apparatus may further comprise: an operation unit for performing an operation on the result of accumulation stored in the second register; and a third register for storing a result of operation by the operation unit, wherein the operation by the operation unit and writing, by the second memory controller, of a result of operation to the memory proceed in parallel in each cycle of accumulation.

The first memory controller may output read addresses in a non-sequential manner.

The second memory controller may output write addresses in a non-sequential manner.

BRIEF DESCRIPTION OF THE DRAWINGS

Other objects and further features of the present invention will be apparent from the following detailed description when read in conjunction with the accompanying drawings, in which:

FIGS. 4A–4K are timing charts showing how the operation of the information processing apparatus according to the second embodiment is timed;

FIGS. 6A–6M are timing charts showing how the operation of the information processing apparatus according to the third embodiment is timed;

FIGS. 8A–8K are timing charts showing how the operation of the information processing apparatus according to the fourth embodiment is timed;

FIGS. 10A–10I are timing charts showing how the operation of the information processing apparatus according to the fifth embodiment is timed;

FIGS. 12A–12I are timing charts showing how the operation of the information processing apparatus according to the sixth embodiment is timed;

FIGS. 17A–17I are timing charts showing how the operation of the information processing apparatus according to the second related art is timed.

DETAILED DESCRIPTION OF THE PREFERRED EMBODIMENTS

First Embodiment

Figure 1:
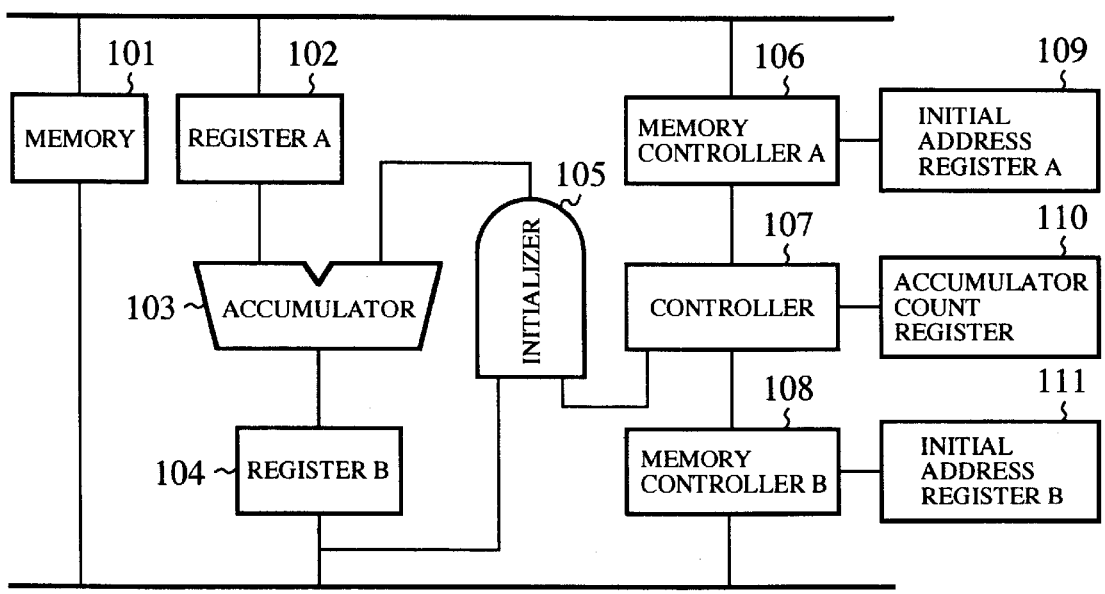
FIG. 1 is a block diagram showing a construction of an information processing apparatus according to a first embodiment of the present invention.

FIG. 1 is a block diagram showing a construction of an information processing apparatus according to a first embodiment of the present invention. Referring to FIG. 1, the apparatus comprises a memory 101 for storing data, a register A 102 (first register) for storing the data read from the memory 101, an accumulator 103 for accumulating the data stored in the register A 102, a register B 104 (second register) for storing a result of accumulation performed by the accumulator 103 and an initializer 105 for initializing the result of accumulation in the accumulator 103 to 0.

Referring also to FIG. 1, a memory controller A 106 (first memory controller) outputs read addresses and controls the reading from the memory 101, a memory controller B 108 (second memory controller) outputs write addresses and controls the writing to the memory 101. A controller 107 controls the timing of initialization of the read addresses output by the memory controller A 106, the timing of initialization of the accumulator 103 performed by the initializer 105, the timing of initialization of the write addresses output by the memory controller B 108. An initial address register A 109 (first initial address register) stores an initial value of the read address output by the memory controller A 106. An accumulator count 103 register 110 stores the number of data items accumulated by the accumulator 103 and the frequency of repetition of accumulation. An initial address register B 111 (second initial address register) stores an initial value of the write address output by the memory controller B 108.

A description will now be given of the operation according to the first embodiment.

Figure 14:
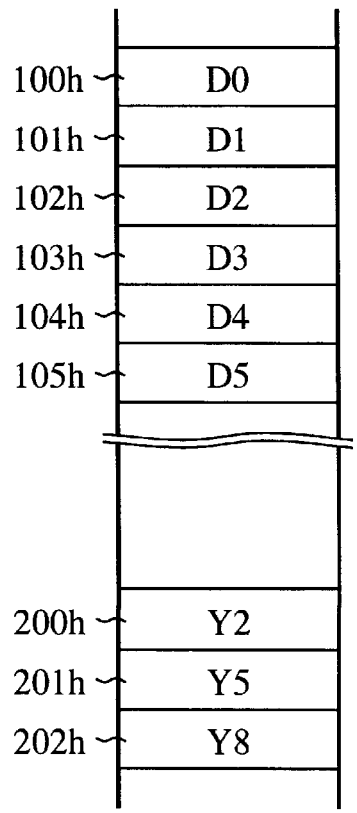
FIG. 14 shows an example of how data is stored in the information processing apparatus according to the first related art.
Figure 15:
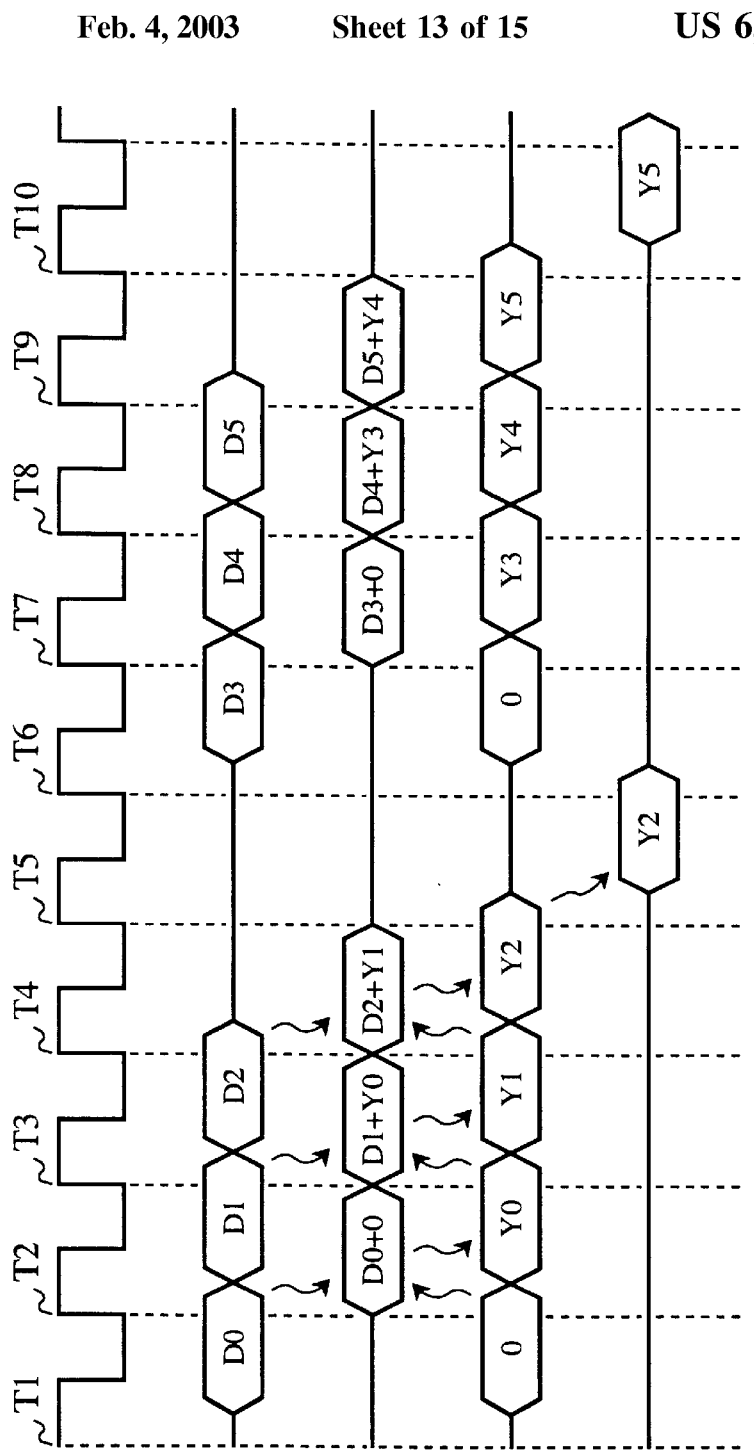
FIGS. 15A–15E are timing charts showing how the operation according to the first related art is timed.
Figure 16:
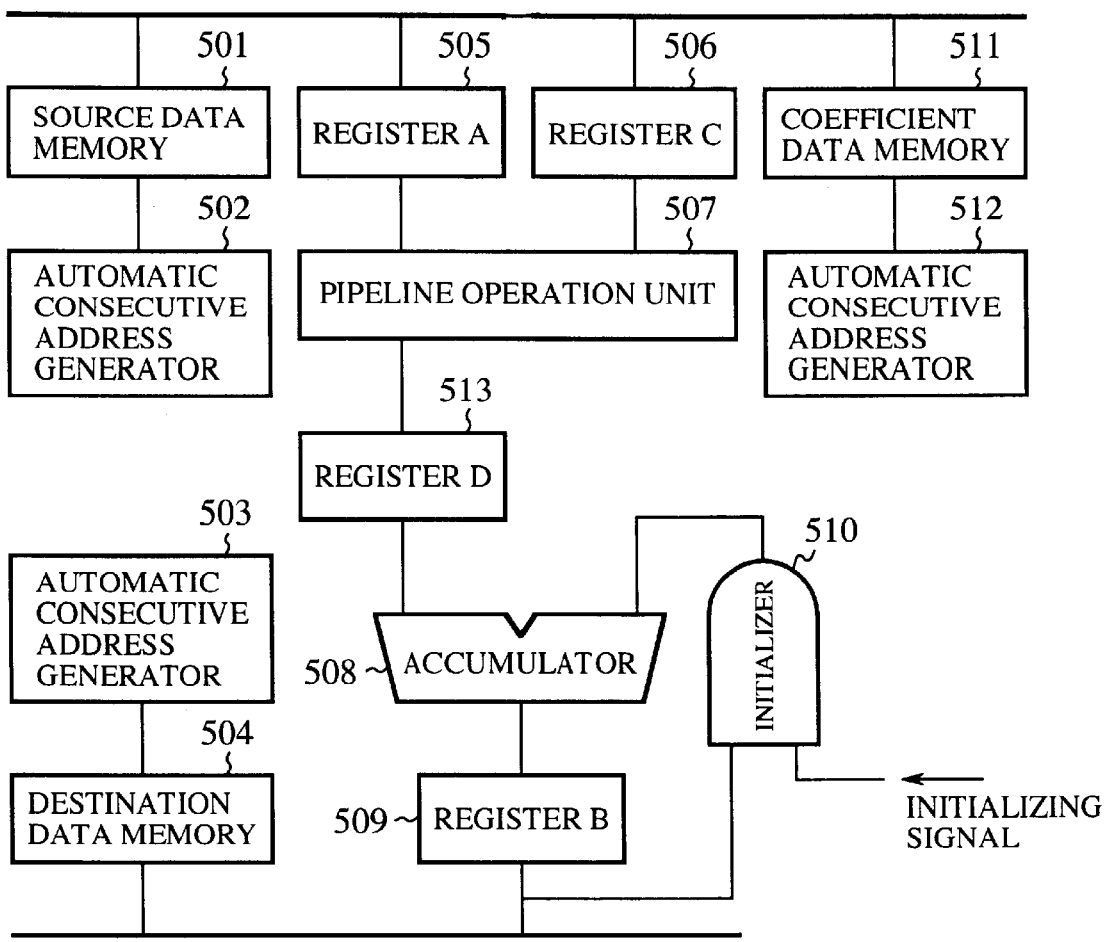
FIG. 16 is a block diagram showing a construction of an information processing apparatus according to a second related art.

It is assumed that data stored in the memory 101 is as shown in FIG. 14. FIGS. 2A–2I are timing charts showing how the operation of the information processing apparatus according to the first embodiment is timed. FIGS. 2A–2I show that each step of the operation occurs at a rising edge of a clock. In a state in which a read address initializing signal output from the controller 107 is at LOW, the read address output from the memory controller A 106 is set to an initial address stored in the initial address register A 109. In a state in which an accumulator initializing signal output from the controller 107 is at LOW, the accumulator 103 is initialized. In a state in which a write address initializing signal output from the controller 107 is at LOW, the write address output from the memory controller B 108 is set to an initial address stored in the initial address register B 111.

In the description below, it is assumed that the initial read address stored in the initial address register A 109, at which address the reading from the memory 101 should start, is 100h. The initial write address stored in the initial address register B 111, at which address the writing to the memory 101 should start, is 200h. The number of data items to be accumulated (hereinafter, simply referred to as accumulated data count) is set to 3 in the accumulator count register 110 and the frequency of repetition of accumulation is set to 2, meaning that an accumulation of three data items is repeated twice. By setting the accumulated data count to 3 and the frequency of repetition of accumulation to 2, the controller 107 outputs the accumulator initializing signal every three cycles and outputs the read address initializing signal and the write address initializing signal every 6 (3×2=6) cycles.

Figure 2:
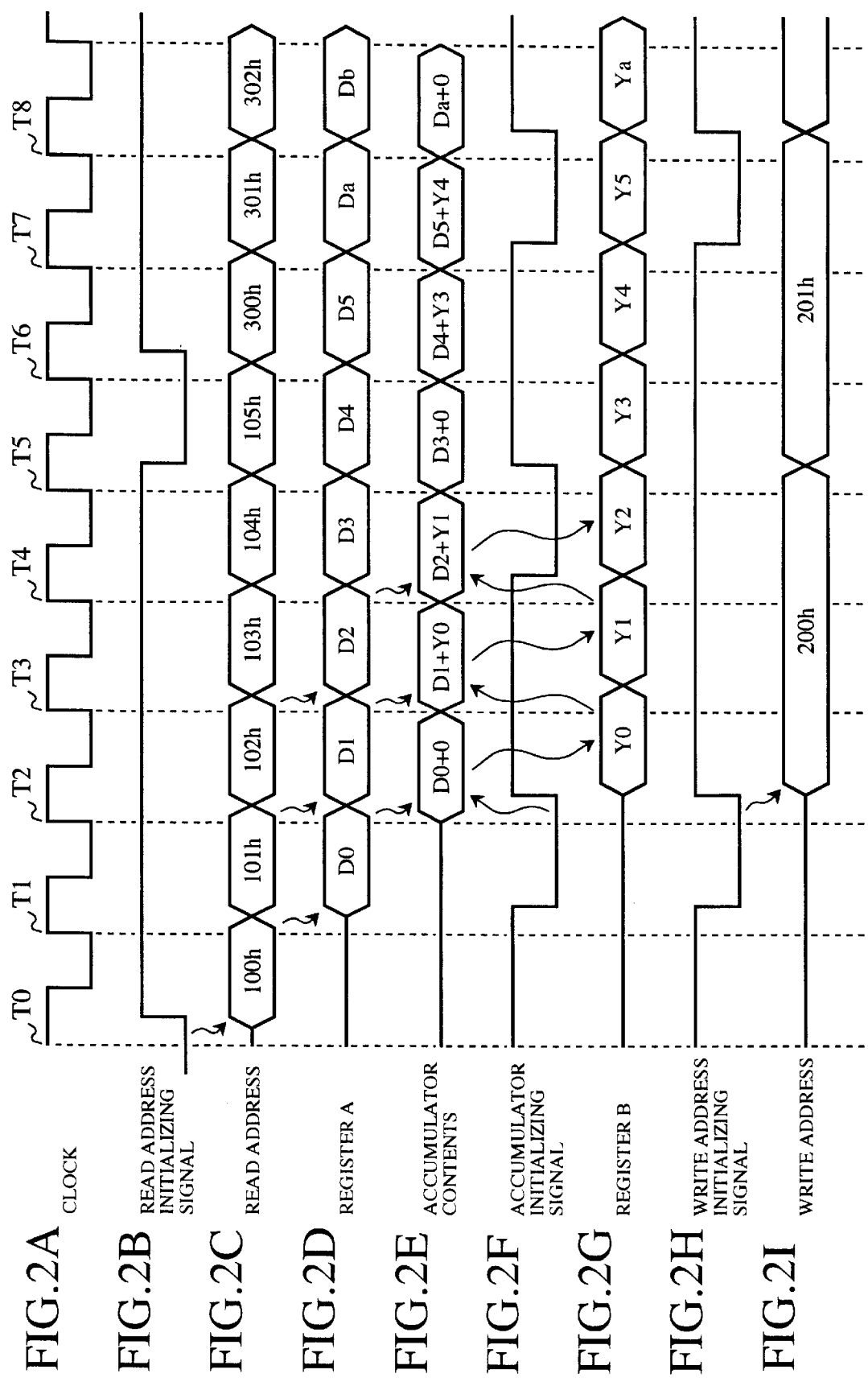
FIGS. 2A–2I are timing charts showing how the operation of the information processing apparatus according to the first embodiment is timed.

Referring to FIG. 2B, the read address initializing signal output from the controller 107 is at LOW at T0 so that the read address output from the controller 107 is set to an initial value of 100h. At T3, the write address initializing signal output from the controller 107 is at LOW so that the write address is set to 200h.

At T1, data D0 at address 100h of FIG. 14 is stored in the register A 102. At T2, data D1 at address 101h is stored in the register A 102. At T3, data D2 at address 102h is stored in the register A 102. Since the accumulator initialization output from the controller 107 is at LOW at T2, the accumulator 103 produces an arithmetic sum of 0 and the data stored in the register A 102 so as to store the result of accumulation D0+0 in the register B 104. When the accumulator initializing signal is at HIGH (at T3, for example), the accumulator 103 produces an arithmetic sum of the data stored in the register A 102 and the data stored in the register B 104. The result Y1 of accumulation of D1 and Y0 is stored in the register B 104.

A series of steps described above is repeated three times until, at T5, data Y2, a final result of accumulation stored in the register B 104, is written to the memory 101 at address 200h shown in FIG. 14. At T8, data Y5, a result of subsequent accumulation stored in the register B 104, is written to the memory 104 at address 201h shown in FIG. 14. Thus, an accumulation of three data items is repeated twice using 8 cycles T1 through T8, as shown in FIGS. 2A–2I. As compared with 10 cycles required in the first related art, a reduction in the processing time using 8 cycles, is achieved.

In the description given above, it is assumed that the accumulated data count is set to 3 and the frequency of repetition of accumulation is set to 2 in the accumulator count register 110. By modifying the setting in the accumulator count register 110, controlling the accumulator initializing signal output from the controller 107 to the initializer 105, controlling the read address initializing signal output from the controller 107 to the memory controller A 106, or controlling the write address initializing signal output from the controller 107 to the memory controller B 108, the apparatus according to the first embodiment is adapted for any desired type of accumulation. By modifying the initial read address set in the initial address register A 109 or the initial write address set in the initial write register B 111, the read address or the write address in the memory 101 is set in a desired manner.

As herein described, an improvement in the efficiency of the process of parallel accumulation is not the only benefit provided by the first embodiment. By setting a desired accumulated data count or a desired frequency of repetition of accumulations in the accumulator count register 110, or by controlling the accumulator initializing signal, the read address initializing signal or the write address initializing signal output from the controller 107, any type of parallel accumulation is processed. Thus, a highly flexible information processing apparatus is obtained.

In further accordance with the first embodiment, by modifying the read address set in the initial address register A 109 and the initial write address set in the initial address register B 111, it is possible to set the read address and the write address in the memory 101 in a desired manner. As a result, a highly flexible information processing apparatus is obtained.

Second Embodiment

Figure 3:
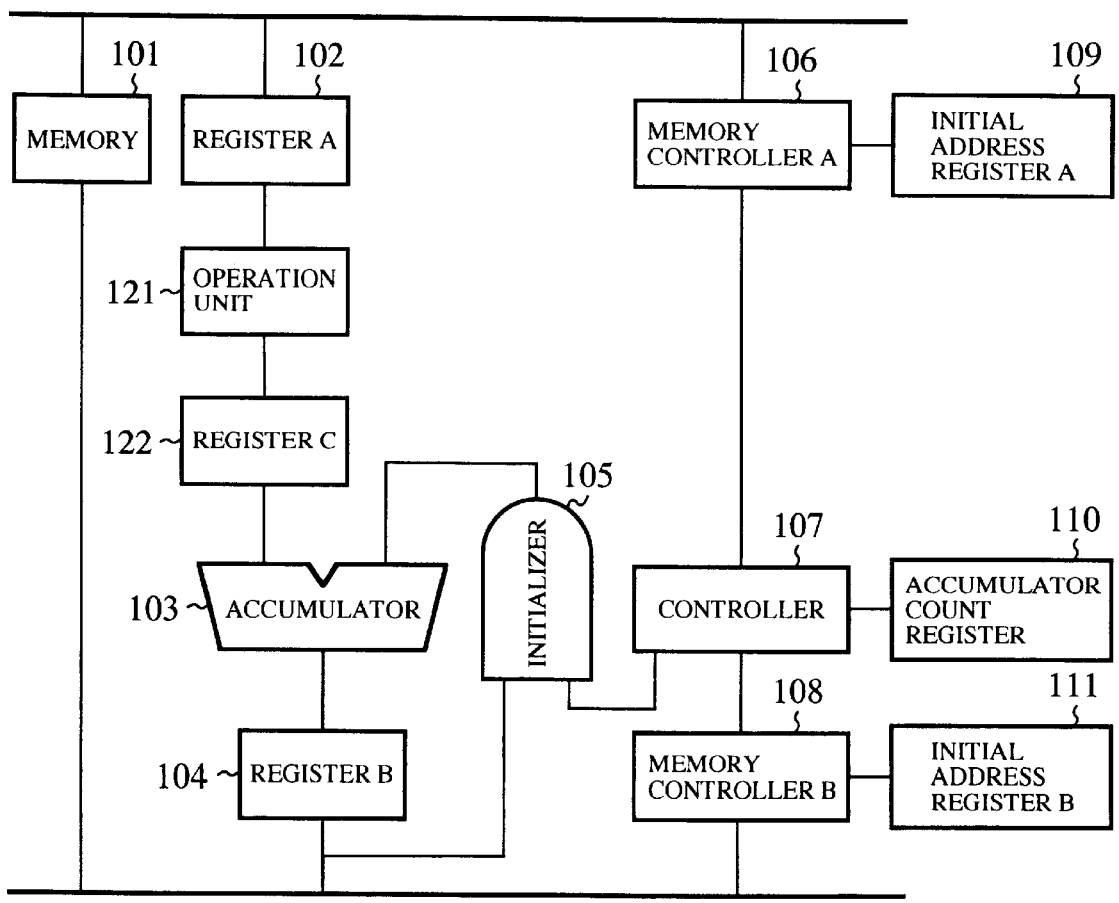
FIG. 3 is a block diagram showing a construction of an information processing apparatus according to a second embodiment of the present invention.

FIG. 3 is a block diagram showing a construction of an information processing apparatus according to a second embodiment of the present invention. Those elements which are considered the same elements as those corresponding to the apparatus according to the first embodiment shown in FIG. 1 are designated by the same reference numerals so that the description thereof is omitted. Referring to FIG. 3, an operation unit 121 produces an absolute value of the data stored in the register A 102. A register C (third register) stores a result of an operation from the operation unit 121.

A description will now be given of the operation according to the second embodiment.

It is assumed that the data stored in the memory 101 is similar to that shown in FIG. 14. FIGS. 4A–4K show how the operation performed by the information processing apparatus according to the second embodiment is timed. FIGS. 4A–4K show that each step of the operation occurs at a rising edge of a clock. In a state in which the read address initializing signal is at LOW, the read address output from the memory controller A 106 is set to an address stored in the initial address register A 109. In a state in which the accumulator initializing signal is at LOW, the result of accumulation in the accumulator 103 is initialized. In a state in which the write address initializing signal is at LOW, the write address output from the memory controller B 108 is set to an address stored in the initial address register B 111.

The operation will be described by assuming that the initial read address stored in the initial address register A 109, at which address the reading from the memory 101 should start, is 100h. The initial write address stored in the initial address register B 111, at which address the writing to the memory 101 should start, is 200h. The accumulated data count stored in the accumulator count register 110 is set to 3 and the frequency of repetition of accumulation is set to 2. Thereby, a process including accumulation of three data items is repeated twice.

Referring to FIG. 4A, the read address initializing signal is at LOW at T0 so that the read address is set to the initial address 100h. At T3, the write address initializing signal is at LOW so that the write address is set to the initial address 200h.

At T1, data D0 at address 100h of FIG. 14 is stored in the register A 102. At T2, data D1 at address 101h is stored in the register A 102. At T3, data D2 at address 102h is stored in the register A 102. At T2, the operation unit 121 produces an absolute value of the data stored in the register A 102. The result of operation Z0, i.e. |D0|, is stored in the register C 122. At T3, the accumulator initializing signal is at LOW so that the accumulator 103 produces an arithmetic sum of 0 and the data stored in the register C 122. The result of accumulation Y0, i.e. Z0+0, is stored in the register B 104.

When the accumulator initializing signal is at HIGH (at T4, for example), the accumulator 103 produces an arithmetic sum of the data stored in the register C 122 and the data stored in the register B 104. The result of accumulation Y1, i.e. Z1+Y0, is stored in the register B 104. A series of steps described above is repeated three times so that data Y2, a final result of accumulation stored in the register B 104, is written at T6 to the memory 101 at address 200h shown in FIG. 14. At T9, data Y5, a result of subsequent accumulation, stored in the register B 104 is written to the memory 101 at address 201h. An accumulation of data involving an operation of producing an absolute value is repeated twice using 9 cycles T1 through T9, as shown in FIGS. 4A–4K.

In contrast, it requires a total of 12 cycles for the apparatus according to the first related art to repeat a three-step data accumulation including an absolute value operation twice. This is because an operation of producing an absolute value requires one cycle. Thus, the second embodiment provides an improvement in the processing speed.

The apparatus is described as being adapted for a process involving an operation for producing an absolute value of the data stored in the register A 102 using the operation unit 121. However, the second embodiment is also applicable to a shift operation.

In the description given above, it is assumed that the accumulated data count is set to 3 and the frequency of repetition of accumulation is set to 2 in the accumulator count register 110. By modifying the setting of the accumulator count register 110, controlling the accumulator initializing signal output from the controller 107 to the initializer 105, controlling the read address initializing signal output from the controller 107 to the memory controller A 106, or controlling the write address initializing signal output from the controller 107 to the memory controller B 108, any type of parallel accumulation is processed. By modifying the initial read address set in the initial address register A 109 or the initial write address set in the initial address register B 111, the read address or the write address in the memory 101 is set in a desired manner.

Thus, according to the third embodiment, the efficiency of parallel accumulation process is improved. In addition, by setting a desired accumulated data count or a frequency of repetition of accumulation in the accumulator count register 110, or controlling the accumulator initializing signal, the read address initializing signal or the write address initializing signal output from the controller 107, any type of accumulation operation is processed. Thus, a highly flexible information processing apparatus is obtained.

In further accordance with the second embodiment, by modifying the initial read address set in the initial address register A 109 or the initial write address set in the initial address register B 111, the read address or the write address in the memory 101 is set in a desired manner. Thus, a highly flexible information processing apparatus is obtained.

Third Embodiment

Figure 5:
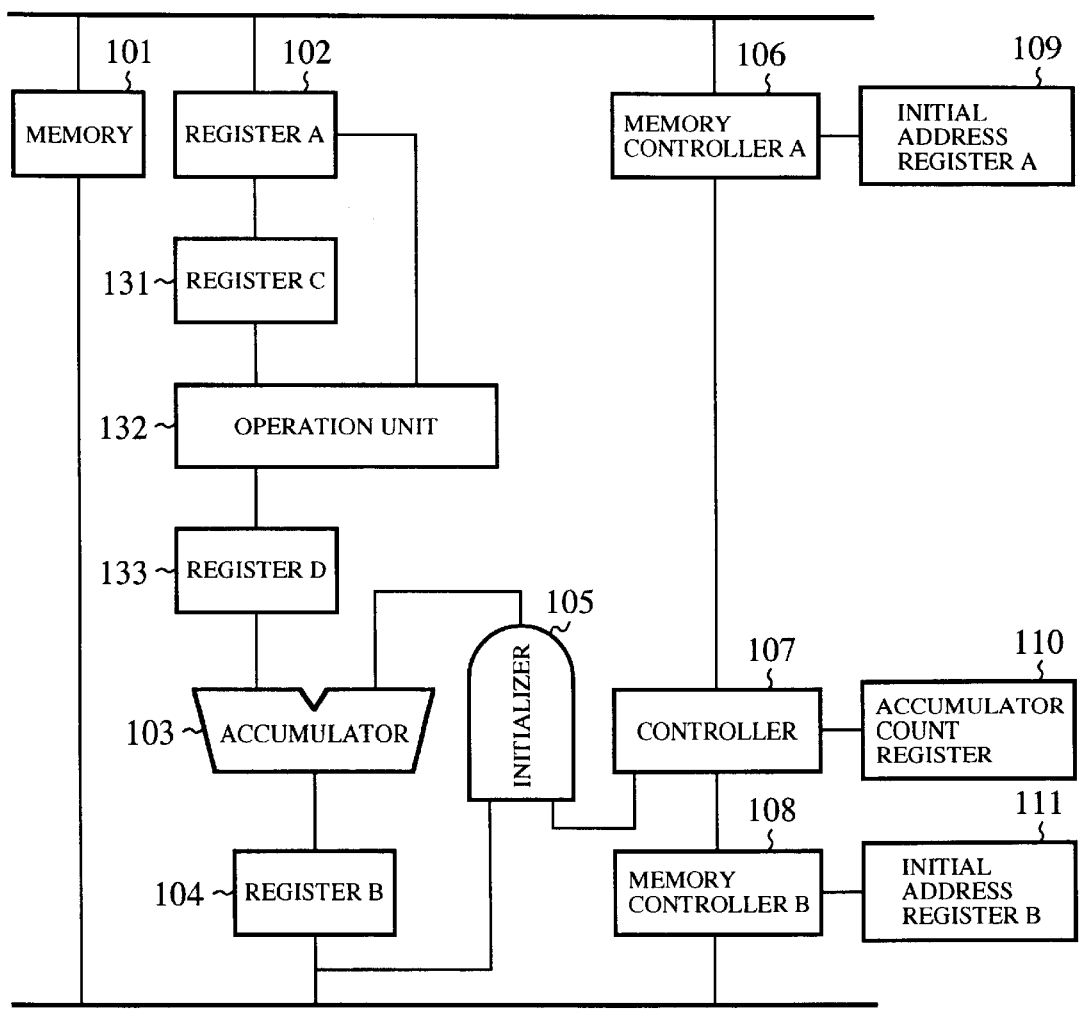
FIG. 5 is a block diagram showing a construction of an information processing apparatus according to a third embodiment of the present invention.

FIG. 5 is a block diagram showing a construction of an information processing apparatus according to a third embodiment of the present invention. Those elements that are identical to the corresponding elements in the apparatus according to the first embodiment shown in FIG. 1 are designated by the same reference numerals so that the description thereof is omitted. Referring to FIG. 5, a register C 131 (third register) stores data stored in the register A 102. An operation unit 132 produces a difference between the data stored in the register C 131 and the data stored in the register A 102. A register D 133 (fourth register) stores a result of operation by the operation unit 132.

A description will now be given of the operation according to the third embodiment.

It is assumed that data stored in the memory 101 is as shown in FIG. 14. FIGS. 6A–6M are timing charts showing how the operation of the information processing apparatus according to the third embodiment is timed. FIGS. 6A–6M show that each step of the operation occurs at a rising edge of a clock. In a state in which the read address initializing signal is at LOW, the read address output from the memory controller A 106 is set to an initial address stored in the initial address register A 109. In a state in which the accumulator initializing signal is at Low, the result of accumulation in the accumulator 103 is initialized. In a state in which the write address initializing signal is at LOW, the write address output from the memory controller B 108 is set to an initial address stored in the initial address register B 111. In a state in which the accumulator timing signal output from the controller 107 is at LOW, accumulation is performed in the accumulator 103.

It is assumed here that the initial read address stored in the initial address register A 109, at which the reading from the memory 101 should start, is 100h. The initial write address stored in the initial address register B 111, at which the writing to the memory 101 should start, is 200h. The accumulated data count stored is set to 3 and the frequency of repetition of accumulation is set to 2 in the accumulator count register 110, specifying that an accumulation of three data items is repeated twice.

Referring to FIG. 6B, at T0, the read address initializing signal is at LOW so that the memory read address is initialized to 100h. AT T4, the write address initializing signal is at LOW so that the write address is initialized to 200h.

At T1, data D0 at address 100h of FIG. 14 is stored in the register A 102. At T2, data D1 at address 101h is stored in the register A 102. At T3, data D2 at address 102h is stored in the register A 102. The data stored in the register A 102 is also stored in the register C 101 with a delay of 1 cycle. At T3, the operation unit 132 produces a difference between the data stored in the register A 102 and the data stored in the register C 131. A result of operation Z0, i.e. D1–D0, is stored in the register D 133. At T4, the accumulator initializing signal is at LOW and the accumulator timing signal is at LOW so that the accumulator 103 produces an arithmetic sum of 0 and the data stored in the register D 133. A result of accumulation Y0, i.e. Z0+0, is stored in the register B 104.

When the accumulator initializing signal is at HIGH and the accumulation timing signal is at LOW (at T6, for example), the accumulator 103 produces an arithmetic sum of the data stored in the register D 133 and the data stored in the register B 104. A result of accumulation Y1, Z2+Y0, is stored in the register B 104. A series of steps described above is repeated three times so that data Y2, a final result of accumulation stored in the register B 104, is written to the memory 101 at address 200h of FIG. 14.

Thus, as shown in FIGS. 6A–6M, a total of 10 cycles T1 through T10 are required for a three-step data accumulation involving a subtraction operation. In a process of accumulation involving an additional subtraction operation, a total of 6 cycles T5 through T10 of FIGS. 6A–6M are required, requiring a total of 16 cycles for the entire process.

If the related-art apparatus is employed to process the accumulation of three data items involving a subtraction operation, a total of 5 cycles are required for a single subtraction operation, requiring a total of 20 cycles for the entire process. Thus, the invention according to the third embodiment provides a higher processing speed than the first related art.

The third embodiment is described as being adapted for a subtraction operation in which the operation unit 132 produces a difference between the data stored in the register C 131 and the data stored in the register A 101. The third embodiment is also applicable to an operation in which a difference and an absolute value thereof are produced.

In the example given above, the accumulated data count set in the accumulator count register 110 is 3 and the frequency of repetition of accumulation set in the accumulator count register 110 is 2. By modifying the setting of the accumulator count register 110, or by controlling the accumulator initializing signal output from the controller 107 to the initializer 105, the read address initializing signal output from the controller 107 to the memory controller A 106, or the write address initializing signal output from the controller 107 to the memory controller B 108, any type of accumulation is processed. By modifying the initial read address set in the initial address register A 109 or the initial write address set in the initial address register B 111, the read address or the write address in the memory 101 is set in a desired manner.

As described, according to the third embodiment, the efficiency of parallel accumulation process is improved. In addition, by setting a desired accumulated data count or a desired frequency of repetition of accumulation in the accumulator count register 110, or by controlling the accumulator initializing signal, the read address initializing signal or the write address initializing signal output from the controller 107, any type of accumulation is processed. Thus, a highly flexible information processing apparatus is obtained.

In further accordance with the third embodiment, by modifying the initial read address set in the initial address register A 109 or the initial write address set in the initial address register B 111, the read address or the write address in the memory 101 is set in a desired manner. Thus, a highly flexible information processing apparatus is obtained.

Fourth Embodiment

Figure 7:
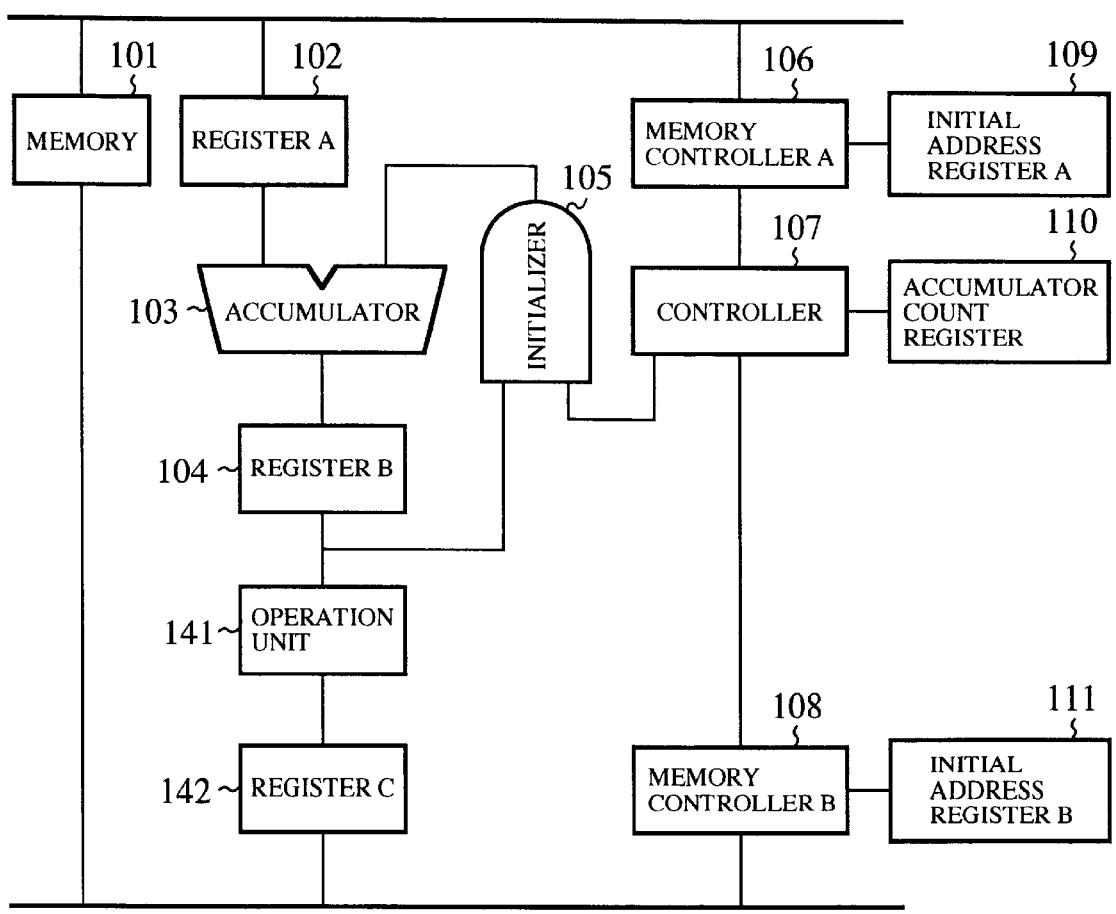
FIG. 7 is a block diagram showing a construction of an information processing apparatus according to a fourth embodiment of the present invention.

FIG. 7 is a block diagram showing a construction of an information processing apparatus according to a fourth embodiment of the present invention. Those elements that are identical to the corresponding elements of the apparatus according to the first embodiment shown in FIG. 1 are designated by the same reference numerals so that the description thereof is omitted. Referring to FIG. 7, an operation unit 141 produces an absolute value of data stored in the register B 104. A register C 142 (third register) stores a result of operation performed by the operation unit 141.

A description will now be given of the operation according to the fourth embodiment.

It is assumed that data stored in the memory 101 is as shown in FIG. 14. FIGS. 8A–8K are timing charts showing how the operation of the information processing apparatus according to the fourth embodiment is timed. FIGS. 8A–8K show that each step of the operation occurs at a rising edge of a clock. In a state in which the read address initializing signal is at LOW, the read address output from the memory controller A 106 is set to the initial address stored in the initial address register A 109. In a state in which the accumulator initializing signal is at LOW, the accumulator 103 is initialized.

IT is assumed that the initial read address stored in the initial address register A 109, at which the reading from the memory 101 should start, is 100h. The initial write address stored in the initial address register B 111, at which the writing to the memory 101 should start, is 200h. In the accumulator count register 110, the accumulated data count is set to 3 and the frequency of repetition of accumulation is set to 2, specifying that an accumulation of three data items is repeated twice.

Referring to FIG. 8B, the read address initializing signal is at LOW so that the read address is initialized to 100h. At T3, the write address initializing signal is at LOW so that the write address is initialized to 200h.

At T1, data D0 at address 100h of FIG. 14 is stored in the register A 102. At T2, data D1 at address 101h is stored in the register A 102. At T3, data D2 at address 102h is stored in the register A 102. Since the accumulator initializing signal is at LOW at T2, the accumulator 103 produces an arithmetic sum of 0 and the data stored in the register A 102. A result of accumulation Z0, i.e. D0+0, is stored in the register B 104.

When the accumulator initializing signal is at HIGH (at T3, for example), the accumulator 103 produces an arithmetic sum of the data stored in the register A 102 and the data stored in the register B 104. A result of accumulation Z1, i.e. D1+Z0, is stored in the register B 104. At T3, the operation unit 141 produces an absolute value of the data stored in the register B 104. A result of operation Y0, i.e. |Z0|, is stored in the register C 142. A series of the steps described above is repeated three times so that, at T6, data Y2, a final result of accumulation stored in the register C 142, is written to the memory 101 at address 200h. At T9, data Y5, a result of subsequent accumulation stored in the register C 142, is written to the memory 101 at address 201h. Accordingly, a three-step data accumulation involving an absolute value operation is repeated twice using 9 cycles T1 through T9, as shown in FIG. 8.

Using the apparatus according to the first related art, each operation for producing an absolute value requires a cycle. Therefore, a total of 12 cycles are required for the apparatus according to the first related art to repeat a three-step data accumulation involving using an absolute value operation twice. Thus, the fourth embodiment provides a higher speed than the first related art.

The apparatus according to the fourth embodiment is described above as being adapted for a process in which the operation unit 141 produces an absolute value of a result of accumulation stored in the register B 104. The fourth embodiment is also applicable to a process involving a shift operation and a round off operation.

In the description given above, the accumulated data count set in the accumulator count register 110 is 3 and the frequency of repetition of accumulation set in the accumulator count register 110 is 3 is 2. By modifying the setting of the accumulator count register 110, or by controlling the accumulator initializing signal output from the controller 107 to the initializer 105, the read address initializing signal output from the controller 107 to the memory controller A 106 or the write address initializing signal output from the controller 107 to the memory controller B 108, any type of accumulation operation is processed. By modifying the initial read address set in the initial address register A 109 or the initial write address set in the initial register B 111, the read address or the write address in the memory 101 is set in a desired manner.

As described, according to the fourth embodiment, the efficiency of parallel accumulation process is improved. In addition, by setting a desired accumulated data count and a desired frequency of repetition of accumulation in the accumulator count register 110, or by controlling the accumulator initializing signal, the read address initializing signal or the write address initializing signal output from the controller 107, any type of accumulation operation is processed. Thus, a highly flexible information processing apparatus is obtained.

In further accordance with the fourth embodiment, by modifying the initial read address set in the initial address register A 109 or the initial write address set in the initial address register B 111, the read address or the write address in the memory 110 is set in a desired manner. Thus, a highly flexible information processing apparatus is obtained.

Fifth Embodiment

The construction of the information processing apparatus according to a fifth embodiment of the present invention is the same as that of the first embodiment so that the description thereof is omitted.

A description will now be given of the operation according to the fifth embodiment.

Figure 9:
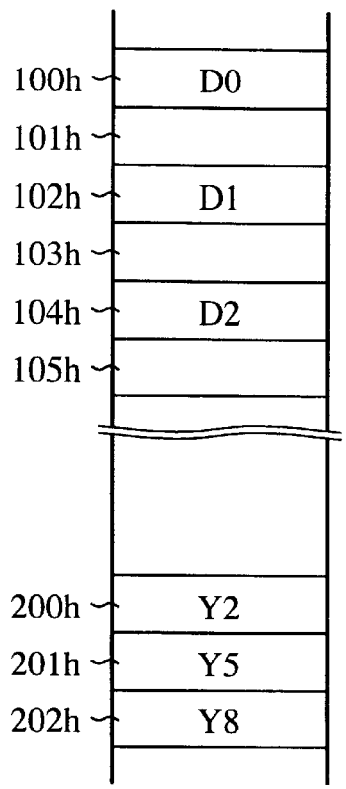
FIG. 9 shows an example of how data is stored in a memory of an information processing apparatus according to a fifth embodiment.

FIG. 9 shows how data is stored in the memory 101 according to the fifth embodiment. Data D0 is stored at address 100h, data D1 at address 102h, data D2 at address 104h, data Y2 at address 200h, data Y5 at address 201h and data Y8 at address 202h.

FIGS. 10A–10I are timing charts showing how the operation of the information processing apparatus according to the fifth embodiment is timed. FIGS. 10A–10I show that each step of the operation occurs at a rising edge of a clock. In a state in which the read address initializing signal is at LOW, the read address output from the memory controller A 106 is initialized to an address stored in the initial address register A 109. In a state in which the accumulator initializing signal is at LOW, the accumulator 103 is initialized. In a state in which the write address initializing signal is at LOW, the memory address output from the memory controller B 108 is initialized to an address stored in the initial address register B 111.

It is assumed herein that the initial read address set in the initial address register A 109, at which address the reading from the memory 101 should start, is 100h. The initial write address set in the initial address register B 111, at which address the writing to the memory 101 should start, is 200h. In the accumulator count register 110, the accumulated data count is set to 3 and the frequency of repetition of accumulation is set to 2. Thereby, a process of accumulating three data items is repeated twice.

Referring to FIG. 10B, the read address initializing signal is at LOW at T0 so that the read address is initialized to 100h. At T2, the write address initializing signal is at LOW so that the write address is initialized to 200h.

At T1, data D0 at address 100h of FIG. 9 is stored in the register A 102. The memory controller A 106 updates the read address non-sequentially with an increment of 1h. At T2, data D1 at address 102h is stored in the register A 102. At T3, data D2 at address 104h is stored in the register A102.

The subsequent steps are the same as the corresponding steps in the first embodiment so that the description thereof is omitted. In the description given above, it is assumed that the read address is updated with an increment of 1h. However, the fifth embodiment is also applicable to arrangements of non-sequential updates other than that of 1h increments.

As described, with the non-sequential reading of the data from the memory 101 according to the fifth embodiment, it is not necessary for data subject to an accumulation process to be stored in a contiguous area in the memory 101.

Sixth Embodiment

The construction of an information processing apparatus according to a sixth embodiment of the present invention is the same as that of the first embodiment shown in FIG. 1.

A description will now be given of the operation according to the sixth embodiment.

Figure 11:
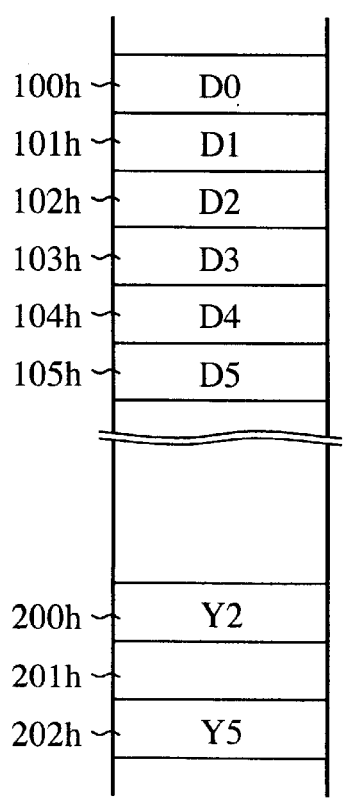
FIG. 11 shows an example of how data is stored in a memory of an information processing apparatus according to a sixth embodiment of the present invention.
Figure 13:
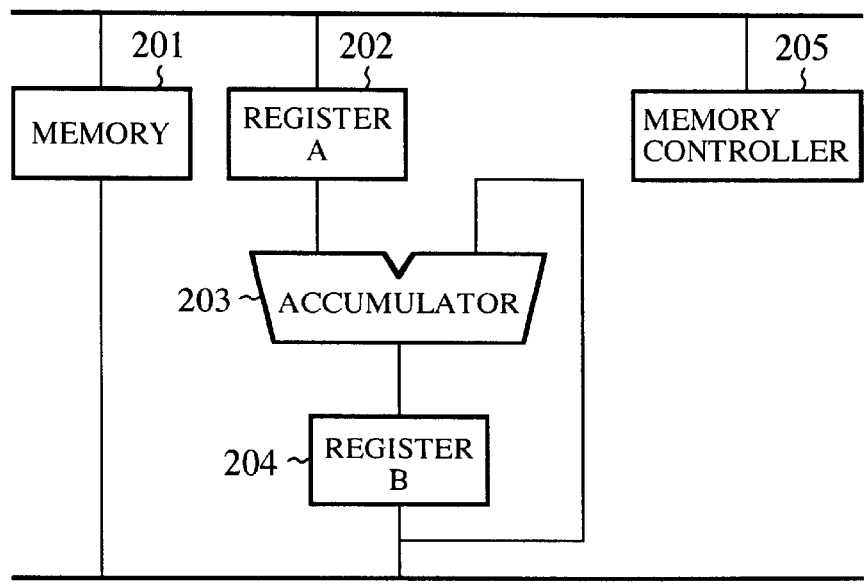
FIG. 13 is a block diagram showing a construction of an information processing apparatus according to a first related art.

FIG. 11 shows an example of how data is stored in the memory 101. Data D0 is stored at address 100h, data D1 is stored at address 101h, data D2 is stored at address 102h, data Y2 is stored at address 200h and data Y5 is stored at address 202h.

FIGS. 12A–12I are timing charts showing how the operation of the information processing apparatus according to the sixth embodiment is timed. FIGS. 12A–12I show how each step of the operation occurs at a rising edge of a clock. In a state in which the read address initializing signal is at LOW, the memory address output from the memory controller A 106 is initialized to an address stored in the initial address register A 109. In a state in which the accumulator initializing signal is at LOW, the accumulator 103 is initialized. In a state in which the write address initializing signal is at LOW, the memory address output from the memory controller B 108 is initialized to an address stored in the initial address register B 111.

It is assumed herein that the initial read address stored in the initial address register A 109, at which address the reading from the memory 101 should start, is 100h. The initial write address stored in the initial address register B 111, at which address the writing to the memory 101 should start, is 200h. In the accumulator count register 110, the accumulated data count is set to 3 and the frequency of repetition of accumulation is set to 2, meaning that an accumulation of three data items is repeated twice.

Referring to FIG. 12B, the read address initializing signal is at LOW so that the read address is initialized to 100h. At T2, the write address initializing signal is at LOW so that the write address is initialized to 200h.

Storage of the result of accumulation in the register B 104 and the preceding steps are the same as the corresponding steps in the first embodiment so that the description thereof is omitted. At T5, data Y2, a final result of accumulation stored in the register B 104, is written to the memory 101 at address 200h of FIG. 11. The memory controller B 108 updates the write address with an increment of 1h. At T8, data Y5, a result of subsequent accumulation stored in the register B 104, is written to the memory 101 at address 202h.

In the description given above, it is assumed that the write address is updated with an increment of 1h. However, the invention is also applicable to an arrangement where the write address is updated with an increment other than 1h.

As described, according to the sixth embodiment, due to the non-sequential writing of the result of accumulation to the memory 101, it is not necessary to reserve a consecutive area in the memory 101 for storage of results of accumulation.

The present invention is not limited to the above-described embodiments, and variations and modifications may be made without departing from the scope of the present invention.

What is claimed is:

1. An information processing apparatus comprising:
a memory for storing data;
a first memory controller for outputting a read address and controlling reading of the data stored in said memory;
a first initial address register for storing an initial value of the read address output from said first memory controller;
a first register controlled by said first memory controller to store the data read from said memory;
an accumulator for accumulating the data stored in said first register;
a second register for storing a result of accumulation by said accumulator;
an initializer for initializing said accumulator and outputting the result of accumulation stored in said second register to said memory;
a second memory controller for outputting a write address and writing the result of accumulation stored in said second register to said memory;
a second initial address register for storing an initial value of the write address output from said second memory controller;
an accumulator count register for storing a frequency of repetition of accumulation and an accumulated data count indicating a number of data items to be accumulated by said accumulator and; and
a controller for timing initialization of said accumulator by said initializer, based on the accumulated data count stored in said accumulator count register, for controlling timing of output of the initial read address from said first memory controller, based on the accumulated data count and the frequency of repetition of accumulation stored in said accumulator count register, and for controlling timing of output of the initial write address from said second memory controller, based on the accumulated data count and the frequency of repetition of accumulation stored in said accumulator count register, wherein
reading, by said first memory controller, of the data from said memory into said first register, accumulation of the read data in said accumulator, and writing, by said second memory controller, of the result of accumulation to said memory proceed in parallel in each cycle of accumulation.

2. The information processing apparatus according to claim 1, further comprising:
an operation unit for performing an operation on the data stored in said first register; and
a third register for storing a result of operation by said operation unit, wherein
the operation by said operation unit and accumulation of results of operation stored in said third register proceed in parallel in each cycle of accumulation.

3. The information processing apparatus according to claim 1, further comprising:
a third register for storing first data stored in said first register;
an operation unit for performing an operation on second data stored in said first register and the first data stored in said third register; and a fourth register for storing a result of operation by said operation unit, wherein the operation by said operation unit and accumulation of results of operation stored in said fourth register proceed in parallel in each cycle of accumulation.

4. The information processing apparatus according to claim 1, further comprising:

an operation unit for performing an operation on the result of accumulation stored in said second register; and a third register for storing a result of operation by said operation unit, wherein the operation by said operation unit and writing, by said second memory controller, of a result of operation to said memory proceed in parallel in each cycle of accumulation.

5. The information processing apparatus according to claim 1, wherein said first memory controller outputs read addresses in a non-sequential manner.

6. The information processing apparatus according to claim 1, wherein said second memory controller outputs write addresses in a non-sequential manner.

* * * * *